(12) United States Patent
Hill et al.

(10) Patent No.: US 11,673,840 B2
(45) Date of Patent: *Jun. 13, 2023

(54) COMPLEX COMPOSITE PARTICLES AND METHODS

(71) Applicant: Dynamic Material Systems LLC, Oviedo, FL (US)

(72) Inventors: Arnold Hill, Orlando, FL (US); William Easter, Chuluota, FL (US); Walter Sherwood, Oviedo, FL (US)

(73) Assignee: Dynamic Material Systems LLC, Oviedo, FL (US)

( * ) Notice: Subject to any disclaimer, the term of this patent is extended or adjusted under 35 U.S.C. 154(b) by 240 days.

This patent is subject to a terminal disclaimer.

(21) Appl. No.: 16/337,482

(22) PCT Filed: Oct. 26, 2017

(86) PCT No.: PCT/US2017/058616
§ 371 (c)(1),
(2) Date: Mar. 28, 2019

(87) PCT Pub. No.: WO2018/081477
PCT Pub. Date: May 3, 2018

(65) Prior Publication Data
US 2019/0345071 A1    Nov. 14, 2019

Related U.S. Application Data

(60) Provisional application No. 62/413,385, filed on Oct. 26, 2016.

(51) Int. Cl.
*C04B 35/571*     (2006.01)
*C04B 35/56*      (2006.01)
(Continued)

(52) U.S. Cl.
CPC ........ *C04B 35/571* (2013.01); *C04B 35/5603* (2013.01); *C04B 35/62222* (2013.01);
(Continued)

(58) Field of Classification Search
None
See application file for complete search history.

(56) References Cited

U.S. PATENT DOCUMENTS 2,638,456 A    5/1953    Laning
3,915,906 A    10/1975   Romey
(Continued)

FOREIGN PATENT DOCUMENTS

CN    103992786 A  *  8/2014

OTHER PUBLICATIONS

CN-103992786-A Derwent Abstract, Bib Data, and translation; Fu Kaihui; Fu Kaihui (Year: 2014).*
(Continued)

*Primary Examiner* — Humera N. Sheikh
*Assistant Examiner* — Elizabeth D Ivey
(74) *Attorney, Agent, or Firm* — Christopher Paradies; Paradies Law P.A.

(57) ABSTRACT

A complex composite particle is made of a coal dust and binder composite that is pyrolyzed. Constituent portions of the composite react together causing the particles to increase in density and reduce in size during pyrolyzation, yielding a particle suitable for use as a proppant or in a composite structure.

14 Claims, 18 Drawing Sheets

(51) Int. Cl.
    *C04B 35/622* (2006.01)
    *C04B 41/00* (2006.01)
    *C04B 41/50* (2006.01)
    *C09K 8/80* (2006.01)

(52) U.S. Cl.
    CPC ...... *C04B 41/0072* (2013.01); *C04B 41/5059* (2013.01); *C09K 8/805* (2013.01); *C04B 2235/3895* (2013.01)

(56) References Cited

U.S. PATENT DOCUMENTS

| | | |
|---|---|---|
| 8,961,840 B1 | 2/2015 | Hill et al. |
| 2012/0003136 A1* | 1/2012 | Skala ............ C01B 21/0722 423/290 |
| 2013/0097942 A1 | 4/2013 | Morano et al. |
| 2014/0038860 A1 | 2/2014 | Skala et al. |
| 2016/0280607 A1* | 9/2016 | Land ............... C08L 83/04 |

OTHER PUBLICATIONS

O.Charon et al., Variation in Coal Composition: a Computational Approach to Study the Mineral Composition of Individual Coal Particles, Massachusetts Institute of Technology.

Cara L. et al., ESCA and FTIR Studies of Bituminous Coal, University of Buffalo, SUNY, Buffalo, NY 14214.

Enrico Bernardo, Advanced Ceramics from Preceramic Polymers Modified at the Nano-Scale: a Review, Materials 2014,7, 1927-1956.

ISO 13503-2:2006, Petroleum and natural gas industries-Completion fluids and materials-Part2: Measurement of properties of proppants used in hydraulic fracturing and gravel-packing operations, abstract only.

Ultralow-density hollow ceramsite proppant and preparation method thereof, 9 pages.

* cited by examiner $$\text{roundness} = \frac{\sum r_i / N}{r_{max}}$$

FIG. 4
(PRIOR ART)

| Proximate Analysis | unit | (ar) | (ad) | (db) | (daf) | |
|---|---|---|---|---|---|---|
| Moisture | (wt. %) | 3.3 | 2.7 | | | |
| Ash | (wt. %) | 22.1 | 22.2 | 22.8 | | |
| Volatile Matter | (wt. %) | 27.3 | 27.5 | 28.3 | 36.6 | } 100% |
| Fixed Carbon | (wt. %) | 47.3 | 47.6 | 48.9 | 63.4 | |
| Gross Calorific Value | (MJ/kg) | 24.73 | 24.88 | 25.57 | 33.13 | |

(ar) – as received
(ad) – air dried
(db) – dry basis
(daf) – dry ash free (a) $C_{137}H_{97}O_9NS$ for Bituminous Coal (b) $C_{240}H_{90}O_4NS$ for high-grade Anthracite (c) Coal is divided into 4 ranks:
 (1) Anthracite
 (2) Bituminous
 (3) Sub-bituminous
 (4) Lignite

FIG. 7
(PRIOR ART)

COAL SIZES

COARSE COAL     >25.0mm (≈1 inch)

SMALL COAL     25.0-3.0mm

FINE COAL     < 3.00mm (0.12 inch)

ULTRA FINE COAL     < 0.15mm (0.006 inch)

| Standard Screen Sizes | | | | | |
|---|---|---|---|---|---|
| U.S. Standard Sieve | | | W.S. Tyler Sieve | | |
| Mesh | Inches | Millimeters | Mesh | Inches | Millimeters |
| 20 | 0.033 | 0.84 | 20 | 0.033 | 0.83 |
| 30 | 0.023 | 0.59 | 28 | 0.023 | 0.59 |
| 40 | 0.0165 | 0.42 | 35 | 0.016 | 0.42 |
| 50 | 0.0117 | 0.30 | 48 | 0.0116 | 0.30 |
| 60 | 0.0098 | 0.25 | 60 | 0.0097 | 0.25 |
| 100 | 0.0058 | 0.149 | 100 | 0.0058 | 0.15 |
| 140 | 0.0041 | 0.105 | 150 | 0.0041 | 0.10 |
| 200 | 0.0029 | 0.074 | 200 | 0.0029 | 0.074 |
| 325 | 0.0017 | 0.044 | 325 | 0.0017 | 0.043 |

ASTM-E lists typical screen sizes as 80, 100, 120, 140, 170, 200, 230, 270, 325, 400.
Source: http://www.barringer1.com/dec00prb.htm

FIG. 10

Test bars of 100mm x 7mm x 7mm were produced for property testing.

| TEST | VALUE | UNITS |
|---|---|---|
| Fracture Toughness | 0.70 | Mpa-m^1/2 |
| Flexural Strength | 26.1 | Mpa |
| CTE at 20°C | 2.77 | 1E-6in/in°C |
| Thermal Conductivity | 0.805 | W/mK |
| Thermal Diffusivity | 0.591 | mm²/s |
| Young's Modulus | 16.3 | Gpa |
| Shear Modulus | 6.8 | Gpa |
| Poisson's Ratio | .220 | - |
| Density | 1.26 | g/cc |
| Electrical Resistivity | 0.397 | Ohm-cm |
| Continuous Operating Temp. | Maximum 600 | °C |

(b)

COMPLEX COMPOSITE PARTICLES AND METHODS

CROSS RELATED APPLICATIONS

This application is a 371 U.S. national phase application of PCT/US2017/058616 filed Oct. 26, 2017 which claims priority of the filing date of U.S. Provisional Appl. No. 62/413,385, which was filed on Oct. 26, 2016, the entirety of which is hereby incorporated by reference herein, except for paragraph [0008] of the provisional application.

FIELD OF THE INVENTION

The field relates to composite materials, especially to in situ composites made using coal dust and coal particles.

BACKGROUND

Experts in the field did not think that coal dust or small coal particles could be used to make composite particles and composite articles. The impurities in every source of coal, which is a fossil fuel dug from the ground, is legendary. Every source of coal is comprised of carbonaceous material and many impurities, often hundreds of organic and inorganic substances are found in coal, when it is analyzed. O. Charon et al., "Variation in Coal Composition: a Computational Approach to Study the Mineral Composition of Individual Coal Particles," shows an example of a composition of one source of coal, Upper Freeport raw coal, and tries to use a computational model to predict the fly ash evolution during pulverized coal combustion, which depends on the amount, composition and spatial distribution of the inorganic matter within individual particles, using computer controlled scanning electron microscopy (CCSEM) to measure mineral distributions in particles as input to the computation model. The model only accounts for five mineral species: quartz, kaolinite, illite, mixed silicates, and pyrite. Even though other minerals exist, these are considered the main constituents affecting fly ash evolution (and were the ones available from CCSEM analysis). Other ways of analyzing coal is by Electron Spectroscopy for Chemical Analysis (ESCA) and Fourier Transform Infrared Spectroscopy (FTIR). Cara L., et al., "ESCA and FTIR Studies of Bituminous Coal," discloses a study of surface chemistry of coal powder showing elements carbon, oxygen, nitrogen, sulfur under various storage conditions. Sulfur was found on the surface of some but not all of the samples. Other elements were detected including: aluminum, silicon, sodium, iron and potassium, but the iron and potassium elements were found only on the surface of one of the raw samples. The sulfur was reportedly found in inorganic and organic species. While a great deal of research has been done to determine compositions of a few types of coal, these types of coal have been analyzed for the effects of composition on use of the coal as a fuel and not as a structural material.

Experts in the field of composites were convinced that coal dust would not provide consistent results comparable to modern composite materials, which are engineered using sources of consistent fillers and compatible polymers and resins. U.S. Pat. No. 2,638,456 was filed in 1949 and issued on May 12, 1953, and it successfully incorporated anthracite particles, the purest form of coal, as a filler in a rubber matrix for plastic cases. However, it used a standard process at the time for mixing anthracite and synthetic rubber. Similarly, U.S. Pat. No. 3,915,906 issued in the 1970's and used coal powder mixed with a polymer, and optionally reinforcing fibers, to make gaskets. Again, the polymer was conventional mixed with the powder and formed as a sheet or the like.

Some other references in the literature to "coal" as a filler are referring to coal as a raw ingredient that is processed by cracking to produce coal tar, graphite, coke or the like. Cracking substantially changes the chemistry and nature of coal, and the definition of coal, herein, does not include products produced by cracking or other high temperature processing, dissolution, liquification or the like. Instead, coal refers to raw coal, which may be processed by milling to reduce the size of coal particles, sorting into particular particle sizes and drying, to remove water and/or volatiles, which does not change, substantially, the chemical nature of the coal.

U.S. Pat. No. 8,961,840, the disclosure of which is incorporated by reference herein in its entirety, discloses a process of making spherical ceramic particles utilizing a process that dries particles formed from a polymer selected to form a ceramic when pyrolyzed. These ceramic particles are referred to as polymer derived ceramic particles.

A proppant is a solid material, typically sand, treated sand or man-made ceramic materials, designed to keep an induced hydraulic fracture open, during or following a fracturing treatment. The proppant must resist crushing and must have sufficient permeability through or around the proppant particles for extraction of gas. Proppants must allow gas under high pressure to escape through interstitial spaces between particles. There is a trade off between size of interstitial spaces and strength. Proppants must have sufficient mechanical strength to withstand closure stresses in order to hold fractures open after fracturing fluid is withdrawn and pressure released. While large proppant particle sizes have greater permeability than smaller particle sizes, at low closure stresses, higher closer stresses cause proppants with large particle sizes to fail mechanically. Crushing produces very fine particulates, called fines, at high closure stresses. Smaller particle size for proppants is preferred for higher closure stresses. Sand, ceramics and sintered bauxite particles are known to have been used as proppants, and there are benefits and disadvantages using any of the known proppants. ISO 13503-2:2006 is a standard for measuring the properties of proppants that has been adopted by industry. Unless otherwise specified, properties of proppants disclosed are determined according to this standard.

One trade-off is strength and density. Increased strength is known to corn, with increased density. Increased density typically requires higher pressures, costs and other complications. Furthermore, low density proppants are preferred over higher density proppants, because a lower density (less than 2.5 grams per cubic centimeter) reduces pumping pressures, increases fluid velocities and keeps particles in suspension without settling out, longer. Proppant geometry is also important, with spherical particle shapes and round particle shapes being preferred over non-spherical and particles with angular features. Proppant choice and cost impacts output rate, recovery and return on investment of a well. One significant cost is transportation costs from supplier to site, and transportation cost is directly related to density, also.

Coal dust may be formed by coal mining operations and by deliberately crushing coal and/or milling the coal dust into finer and finer particles. The particle size of coal dust is typically in a range from 1 to 100 microns, although any size of coal particle may be formed by crushing, milling and sorting of coal dust. Herein, the definition of coal dust includes dust made from coal deposits and synthetic carbon dust, such as synthetic graphite, to the extent that such synthetic carbon dust is modified to have the same benefits as coal dust. For example, additives may be added to synthetic carbon dust to cause it to have the same characteristics during pyrolyzation as the dust produced from mined coal dust or mined coal dust that is preheated to drive off low-temperature volatile gases and/or some of the water. Any source of carbon dust that has been modified to substantially perform as coal dust performs is referred to herein as coal dust. Synthetic graphite may be provided having particles sizes of 1 to 10 microns with particle size distributions of 10 to 50 percent of the particle size, depending on the particle size selected. Additives such as organic compounds and hydrocarbons may be added to synthetic graphite to make synthetic graphite behave more like coal dust. Surprisingly, synthetic graphite, when added to a polymer derived ceramic material fails to provide particles and composite articles having the same characteristics, when processed identically, as coal dust. In one example, coal dust was pre-pyrolyzed to drive off water and organic compounds from the coal dust, leaving a powdered carbon dust or a gravely mixture of carbon, depending on the source of the coal, which was then milled to a powdery carbon dust. The pre-pyrolyzed coal dust, which was pyrolyzed in a substantially non-oxidizing atmosphere, produced a carbon dust that failed to produce particles and composite articles as un-pyrolyzed coal dust. However, pre-heated coal dust, which was preheated at a temperature less than 400 degrees centigrade, driving off low temperature volatile organic compounds and some water, performed the same or similarly when used in composite particles and articles as the as-received coal dust. Coal is abundantly available and costs less than $0.02 center per pound and is comparatively easy to crush into a dust and to grade into various sieve sizes. However, due to coal dusts varying compositions, depending on the source and type of the coal, it has not been considered as a source for production of modern composite materials. Surprisingly, the use of coal dust, which contains a number of volatile and comparatively non-volatile organic compounds and hydrates, resulted in composite beads, rods and three dimensional articles having superior strength to weight (specific strength), toughness and stiffness compared to pre-pyrolyzed coal dust and synthetic carbon particles. Thus, the term coal dust is defined herein to mean any source of carbon dust that performs substantially the same as raw coal dust, other carbon sources modified with additives that simulate raw coal dust, and coal dust that has been pre-heated to less than the temperature that would drive off those less volatile organic compounds and hydrates that cause coal dust to perform as raw coal dust or any coal dust that has been subsequently treated to return such organic compounds and hydrates to the coal dust.

In one example, the coal dust used was pure Wyoming coal powder. When pyrolyzed at 1000 degrees C. in nitrogen, this coal dust came out as a fine, loose powder with a char yield of 57.27%. In another example the coal dust was Austin Black coal powder. When pyrolyzed at 1000 degrees C. in nitrogen, this coal dust came out as a semi fused gravely mixture that had to be ground down in order to rewet and make into ceramic samples, and the fusing of the dust particles was observed to be quite strong. Coal sticks made with Wyoming coal dust and a polymer derived ceramic material (70/30) had a char yield of about 68.3% whereas the same process using Austin Black coal dust had a char yield of about 80%. Herein, "about" refers to the mean within industry acceptable variance from the mean, which is within plus or minus 20% for char yield of the pure Wyoming coal dust. Linear shrinkage of square rods made with Wyoming coal powder and a PDC was about 19.4%. Austin Black sticks made using the same process only shrink about 18%. Herein, about means a linear shrinkage of plus or minus 3%. For example, green body 70/30 sticks made with Wyoming coal dust and PDC had a density of around 1.13 grams per cubic centimeter, which increased to around 1.46 grams per cubic centimeter after pyrolyzation. Green body sticks made using Austin Black coal dust had a density of around 1.2 grams per cubic centimeter, which increased to about 1.7 grams per cubic centimeter after pyrolyzation. Herein, about means plus or minus 0.2 grams per cubic centimeter when referring to density. Fracture strength of Wyoming coal dust and PDC composite sticks was about 35 MPa, and Austin Black coal dust sticks using the same process had a fracture strength greater than 100 MPa. In one example, the fracture strength was 125 MPa for Austin Black coal dust composite sticks. Wyoming coal is a lower grade of coal and is considered sub-bituminous. Lower grades of coal usually have more volatiles than higher grades, as evidenced by the lower char yield and higher shrinkage. Wyoming coal dust seemed more absorbent to PDC resins and required longer times or higher temperatures to remove even volatile solvents.

When comparing Wyoming coal-PDC composites to Austin Black-PDC composites, the Austin Black-PDC composites shows no microcracking or micro-cracking in only a single plane, but microcracking in Wyoming coal-PDC composite sticks shows some microcracking in both the compression plane and the lateral plane. This might result from packing that is excessively tight, causing a rebound effect when pressure was released. In one example, Wyoming coal dust was pre-heated to a temperature high enough to assist in driving off some of the lower temperature volatile organic compounds and water, which increases char yield and density of ceramic composites made using Wyoming coal dust. Thus, the Wyoming coal dust is modified to perform more like Austin Back coal dust, resulting in better composite properties following pyrolyzation. In one example, thermal analysis, such as thermogravimetric analysis (TGA), may be used to compare Austin Black coal dust to Wyoming coal dust. The temperature and time to modify the Wyoming coal dust may be selected, based on the results of thermal analysis to define a temperature and time profile for modifying the Wyoming coal to be more like Austin Black coal dust. In one example, Wyoming coal powder was dried for thirty minutes at 120 degrees C. to remove moisture, prior to rewetting with a solvent. The mass loss from the drying was 3.32% compared to only 1.5% for Austin Black coal dust treated at the same temperature and for the same time. In comparison, mass loss was 8.5% for Amazon coal dust processed at 120 degrees C. for 30 minutes. Thermal analysis may be used to optimize the preheating step to optimize the properties of coal dust prior to adding coal dust to a polymer derived ceramic or other binder. At this point Austin Black coal dust preheated at 120 degrees for 30 minutes has performed the best in composite particles and articles. Surprisingly, synthetic graphite performed the worst and created composites with macro cracking and early failure in trials. This is a very surprising and unexpected result, as the nature of the reactions occurring during pyrolyzation of coal dust and polymer precursors to ceramic articles has never been determined or considered as an advantage.

In one example, coal dust was pre-pyrolyzed to 1000 degrees C. in nitrogen then mixed with polymer derived ceramic resin in a 77 wt % coal dust (Austin Black) to 23 wt % resin ratio, which produces a finished product of the same ratio as the 70 wt % Austin Black coal dust to 20 wt % polymer derived ceramic, without pre-pyrolyzation. 12.06 grams of the pre-pyrolyzed mixture was placed in a 38 millimeter diameter die press and 14,000 lbs of force was applied. The consolidated disk was removed from the die and placed in an oven at 120 degrees C. for 60 minutes to cure. The cured disk had a density of 1.38 grams per cubic centimeter, compared to 1.2 grams per cubic centimeter for a disk formed of pre-heated but not pre-pyrolyzed Austin Black. The pre-pyrolyzed coal dust has a density similar to pure carbon at 1.6 to 1.8 grams per cubic centimeter, while Austin Black coal dust has a density of 1.3 to 1.4 grams per cubic centimeter after being dried for 30 minutes at 120 degrees C. After pyrolyzing the disks in a furnace under nitrogen (a substantially non-oxidizing atmosphere) at 1000 degrees C., using identical firing schedules, the surface of the pre-pyrolyzed samples had multiple, randomly oriented cracks, and no cracks were seen in samples that were not pre-pyrolyzed. Mass of the pre-pyrolyzed sample was 11.26 grams which is 93.36% of the original mass, primarily from the PDC resin. Samples made with coal powder that is not pre-pyrolyzed retained about 80% of the original mass. An expected residual mass of PDC is about 80% of the original. With 23% of a composite formed of PDC, 18.4% of resulting composite would be expected to be contributed by the PDC. Any missing mass probably comes from portions that crumbled off of the edges. It was observed that the sample only shrank 1.5%, which is much less than the 18% shrinkage of coal dust sticks made with non-pre-pyrolyzed coal dust composites. The density of pre-pyrolyzed coal dust ceramic samples decreased from 1.38 to 1.35 grams per cubic centimeter during pyrolyzation of the composite samples. This is very different than the results for coal dust (not subject to pre-pyrolyzation) that increases in density from 1.2 to 1.7 grams per cubic centimeter during pyrolyzation.

Sphericity is a measure of how close to a perfect sphere a particle is. Roundness is a measure of how round a projection of a particle is. The simple, classical method of quantifying sphericity and roundness is to use a standard sphericity and roundness chart, such as the prior art chart shown in FIG. 1. Preferably, a proppant has a sphericity of 0.6 or greater and a roundness of 0.6 or greater. A sphericity and/or roundness of 0.9 is very difficult to obtain for affordable proppants. To obtain this level of sphericity and roundness, the highest level, some sort of an applied coating or milling is typically required, which adds expense and may introduce other issues. Generally, a more spherical proppant has a higher crush strength and fewer fines produced during a crush strength test. The crush strength needed for a proppant generally increases as particle size decreases; however, industry prefers larger particle sizes for formations with lower closure stresses, due to an increase in the permeability around the larger particle sizes. An ideal proppant would have a crush strength, without producing fines, sufficient to withstand expected fracture closure stresses, while providing maximum recovery of hydrocarbons. However, no ideal proppant exists and all proppants have trade-offs. Nevertheless, the industry is constantly looking for an ideal proppant that can be tailored to specific applications at a low cost. No such proppant exists at a cost that is affordable and meets or exceeds all of the properties preferred by industry. The processes described in U.S. Pat. No. 8,961,840, which are incorporated herein by reference in their entirety, are provided as examples for processing the slurry, wherein coal dust may be added in a range greater than 40% but not greater than 90% by weight of coal dust to polymer derived ceramic precursor, more preferably at least 60% and not greater than 80%. As needed, a solvent or nonsolvent, such as a fugitive nonsolvent, may be added to reduce the viscosity of the slurry during processing, for example. The application for these types of materials is limited to those niche applications where cost is very important, because other fillers are available that perform better than coal particles, such as carbon black and fly ash, for example.

FIG. 4 shows an example of the most important calorific constituents of coal in several different forms. For example, it is known in the art how these constituents change from the as received (as), air dried (ad), dry basis (db) and dry ash free (daf) conditions. FIG. 5 schematically shows an example of a coal particle with included minerals, excluded minerals, an organic coal matrix and organically associated elements. FIG. 6 shows an example of a chemical symbol for one type of coal, which shows that coal can be a complex molecular structure. FIGS. 7(*a*)-(*b*) show two examples for chemical equations for coal, showing the difference between bituminous coal and anthracite (a type of coal that has undergone additional pressure and heat in formation of mountains and the like). FIG. 7(*c*)(1-4) divide coal into 4 major ranks and show images of three of the four ranks. FIG. 8 shows the change in hydrogen, carbon and oxygen in some types of coal.

FIGS. 9A-C shows three different types of commercial equipment for making particles. FIG. 9A is disk pelletizer. FIG. 9B is pin mixer, and FIG. 9C is a granulator.

SUMMARY

A proppant is comprised of a complex composite particle, such as a pyrolyzed mixture of coal dust and polymer derived ceramic composite. For example, no more than 90 percent coal dust but no less than 40 percent coal dust is mixed with a polymer or polymers, comprising the remainder of the mixture (i.e. 10 percent to 60 percent). One or more solvents and other additives, such as surfactants, binders, antimicrobials, antifungals and stabilizers may be added to the mixture to create a slurry. Then, the slurry may be further processed to produce ceramic beads comprising a plurality of ceramic constituents derived from the coal dust and polymer. In one example, the particles of coal dust are prepared from coal, such as by pulverizing, crushing and/or milling of coal into a fine dust. Then, the fine dust may be sorted by centrifuging, screening or filtering, such passing the dust through successive sieves, to be within a pre-selected, uniform particle size range (PSR). In one example, a single PSR is selected. In another example, coal dust is selected having a plurality of PSR's, such as a certain fraction having a first PSR and another fraction having a different PSR. The mixing of two or more different PSR's may be selected to create various microstructures within fired and processed beads made from the mixture of PSR's and a polymer derived ceramic matrix.

Alternatively, a proppant may be made from beads of coal dust and a matrix other than a pyrolyzed ceramic. For example, a complex composite particle may comprise a pyrolyzed mixture of coal dust and polymer derived ceramic beads and a polymer matrix and/or shell. For example, a single bead may be covered by a wax or polymer shell. Alternatively, a plurality of beads may be bound together by a polymer matrix and/or shell in a honeycomb array, for example.

In one example, coal dust evolves volatile organics and water during tic firing of beads formed from the slurry, chemically changing the composition of the coal dust and increasing the density of complex particles formed. Alternatively, porosity may be added further reducing the density of the beads by adding porosity to the ceramic beads. The porosity may be closed cell or open cell pores within the ceramic beads. If open celled porosity, the open cells may form a continuous network of porosity only within the coal dust particles or may extend throughout the ceramic beads. The amount of polymer may be varied, such that the polymer serves either as a matrix with coal dust filler or as a binder filling the spaces between compacted coal dust particles. In one example, where the polymer derived ceramic is formed from a polymer that serves as a binder for coal dust particles, the percentage of coal dust to binder may be from 60% by weight of coal dust to total weight of the coal dust and binder to 90% by weight of coal dust to total weight of the coal dust and polymer derived ceramic binder, more preferably 65% to 75%. The properties of the polymer derived ceramic binder, the interface between the polymer derived ceramic binder and the coal dust, and the industrial requirements of the proppant determine the preferred percentage of coal dust to total weight of the coal dust and binder. In one example, an external layer of the ceramic bead is comprised of a layer of the pyrolyzed polymer derived ceramic, substantially free of coal dust particles, which may be slip layer, for example. For example, the compressive strength of a bead of pyrolyzed 100% coal dust would be negligible; however, the fine coal dust has a much higher compressive stress, when formed into a composite with a polymer derived composite. Preferably, the polymer derived composite is one that produces a bead with a sphericity and roundness greater than 0.9 and a compressive fracture strength of at least 2,000 psi, more preferably 5,000 psi, even more preferably 10,000 psi. Preferably, the coal dust is incorporated into the composite bead in a way that does not unnecessarily undermine the compressive strength of the matrix or binder. In one example, a coal dust-ceramic composite meets all of the requirements of the petroleum industry for a proppant at a cost less than 50 cents per pound, more preferably less than 25 cents per pound.

"tic" is an adjective referring to "sis," the heating, ordinarily to very high temperatures, such as 400 to 1000 degrees centigrade, of organic materials, such as polymers, with or without other constituents and additives, to form a ceramic. Such tic heating results in an irreversible, thermochemical decomposition of the organic materials and/or additives at the elevated temperatures, in the absence of oxygen and/or any halogen, resulting in simultaneous changes in chemical composition and physical phase. tic firing may be completed for green bodies and/or beads. In one example, green bodies are heated and at least partially dried and are then pyrolyzed. Then, the ceramic may be further mechanically and/or chemically processed to form ceramic composite beads of a preferred size and shape. For example, nearly spherical beads may be formed by milling and or processing. In one example, surface tension effects are used to drive the formation of beads having a sphericity of no less than 0.9 and a roundness no less than 0.9. In one example, substantially no alumina is present in the ceramic beads.

For example, FIG. 10 shows some standard coal sizes, and smaller sizes may be obtained by pulverizing and/or milling coal into finer and finer particle sizes. Particle sizes of the beads may be tailored to any practical size required by the industry. Particle sizes (PD50) may be prepared from 10 microns to 1000 microns, depending on the fracture closure stresses specified, which is an extraordinarily surprising range of particle size for the composite beads. More preferably, a range from 20 microns to 500 microns meets or exceeds all of the industry standards for closure stresses up to 2,000 psi. Even more preferably, beads with median particle sizes (pd50) from 50 microns to 200 microns meet or exceed all of the industry standards up to a fracture closure stress of 5,000 psi. It is thought, without being limiting in any way, that coal dust filler with small particle sizes, when mixed together with polymer derived ceramic materials, provides the benefits achieved by small diameter proppants, while the polymer derived ceramic, with its greater strength and sphericity provides the advantage of larger particle size. Thus, composite spherical beads with dispersed coal dust within a ceramic matrix or binder may be tailored to achieve whatever properties are needed for a proppant by the petroleum industry. Surprisingly, the porosity introduced by the coal dust and fugitive solvents and nonsolvents are less of a problem at percent additions of coal dust to the combination of polymer and coal dust greater than 40 percent by weight of coal dust to total weight of coal dust plus polymer used for the polymer derived ceramic matrix or binder. These two main constituents, not considering the mass of fugitive binders, solvents and nonsolvents, provide the constituents of the beads after pyrolyzation. In one example, a ceramic bead resistant to crushing at a specific fracture closure stress is desired, in addition to low cost and a density less than 1.5 g/cc. In this example, a ceramic bead may be tailored for the specific conditions desired by adjusting the size of coal dust particles or PSR's, the percentage of coal dust, the presence and thickness of a slip layer on the surface of the bead and the bead diameter selected for use as a proppant in a fracking fluid.

BRIEF DESCRIPTION OF THE DRAWINGS

The following drawings are illustrative examples and do not further limit any claims that may eventually issue.

FIG. 4 illustrates a prior art calorific break down of coal.

FIG. 7 (a)-(c4) illustrate chemical equations for bituminous coal and anthracite, and show images of three of the four major categories in which coal is classified in the prior art.

FIG. 10 illustrates a prior art example of standard coal sizes used in the coal.

When the same reference characters are used, these labels refer to similar parts in the examples illustrated in the drawings.

DETAILED DESCRIPTION

In one example, more than one-half of the composite, by weight, is comprised of coal dust, and the particle size (pd50) of the coal dust particles is at least 10 times smaller than the composite bead particle size, more preferably 20 times smaller, even more preferably 50 times smaller, yet more preferably 100 times smaller. For example, the median particle size (pd50) of the coal dust may be selected in a range from 10 to 200 microns, and median bead size may be selected in a range from 100 to 2000 microns. The coal particles may be agglomerated using a resin binder to form beads. A polymer derived ceramic resin may be used to form a coal-ceramic composite bead.

In one example, the resin binder for the coal dust is a polymer derived ceramic precursor. In another, the binder is a fugitive binder. In yet another, the binder helps to functionalize the surface of the coal dust particles.

Figure 9A:
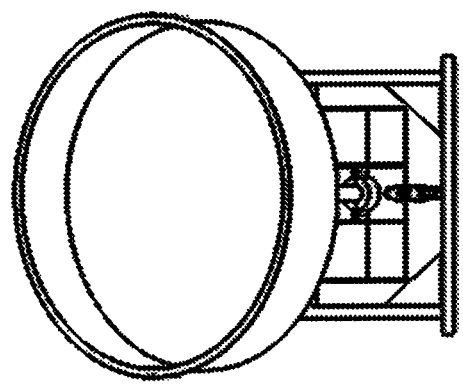
FIGS. 9A-C illustrate machines for processing wet powders to form proppants.
Figure 9B:
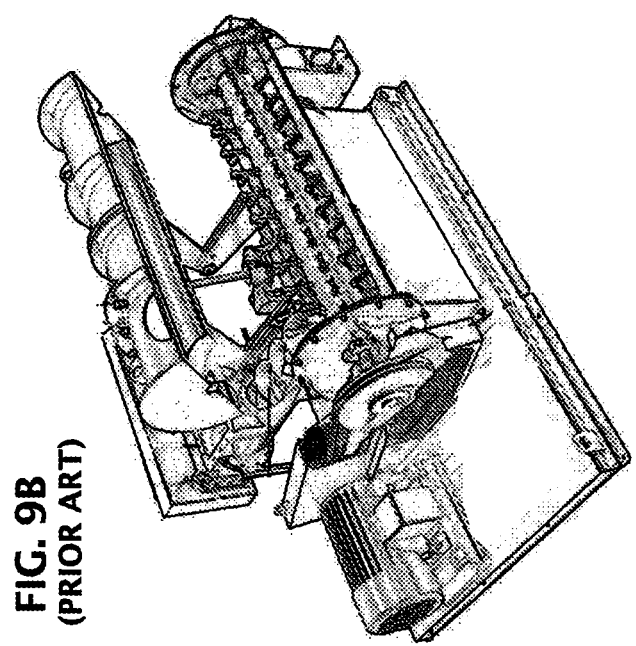
Figure 9C:
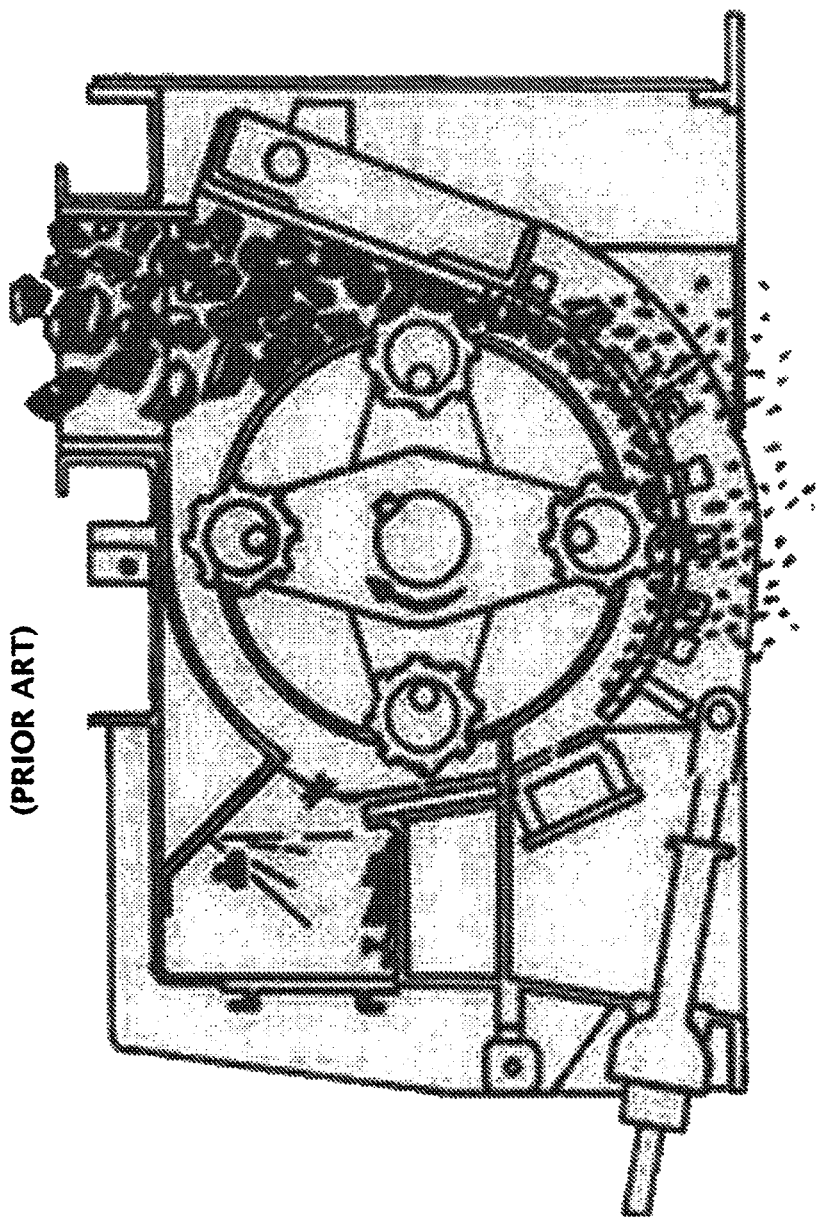
Figure 12:
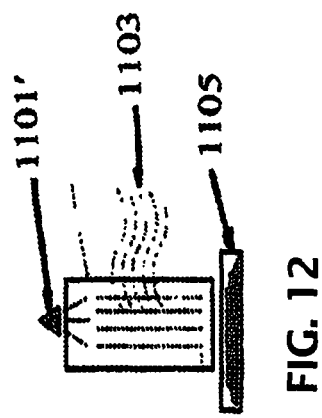
FIG. 12 shows an example of a spray drying process.
Figure 13:
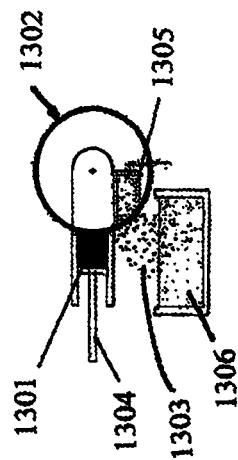
FIG. 13 shows an example of a coal-binder "clay" extrusion process.
Figure 11:
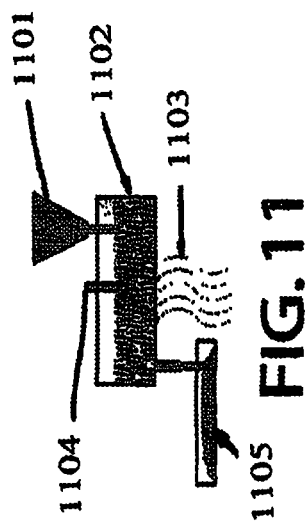
FIG. 11 shows an example of an emulsifier process.

For example, when a resin to coal particle ratio is greater than 1:1, then beads of resin/coal may be formed by emulsion or spray drying. For example, FIG. 11 shows mixture of resin/coal dust being fed into an emulsion tank 1102. Optionally, a mixer or sonicator prevent the emulsified resin/coal drops from coalescing. Heat 1103 may be added to cure or partially cure the beads that are extracted and captured in a separator 1105. Alternatively, beads may be formed by spray drying, as schematically shown in FIG. 12, for example. The slurry is fed through a spray nozzle 1101' and separates into droplets that may be cured or partially cured by heating 1103 and are collected in a separator 1105. For example, a resin to coal ratio from 40:60 to 50:50 may be processed as a moldable clay, as illustrated in the example of FIG. 13, for example. An extruder ram 1304 may force the "clay-like" mixture through a rotating screen 1302. Then, optionally, an hydraulic clay ejector may use a fluid to eject the beads 1303 from the screen 1302 into a separator 1306, for example. For mixtures of binder to coal dust that are less than 40:60, then the mixture may take on the characteristics of a damp powder. Damp powders may be processed by one of the machines in FIGS. 9A-C, for example, such as (A) a disk pelletizer, (B) a pin mixer or (C) a granulator.

The resulting beads may be further processed to add a surface coating, which may be the same material as the binder or may be a different material. The surface coating, if any, may be processed by spraying, rinsing, adding the coating resin to the emulsifier process or otherwise. The coating may be post-processed by heating or curing or partially curing. For example, if the beads are going to be used in a composite, then a tacky surface coating may be desired to aid in agglomeration and/or sticking of one bead to another. For example, beads may be used in three-dimensional printing of composite articles.

The beads may be spheroidized and pyrolyzed to form a compression resistant proppant. A resulting fracture closure resistance of a ceramic bead comprised of a composite of the coal dust and a polymer derived ceramic may be selected in a range from 2,000 psi to 20,000 psi. In one example, a composite ceramic bead is formed with a coal dust and ceramic core and a ceramic shell, substantially devoid of coal dust, and the ceramic bead may have a resistance to fracture stresses between 6,000 psi and 20,000 psi. When pyrolyzed, the ceramic shell binds to the ceramic portion of the core and forms a hardened, nonporous shell, and the core comprises coal dust, porosity and a cancellous ceramic network within a compact shell, mimicking the structure of bone, for example. Alternatively, the shell may be selected as a wax or polymer shell, instead of a ceramic shell. Any suitable wax or polymer may be selected.

The core of a ceramic precursor bead may be processed and at least partially dried and heated, such as at a temperature up to 400 degrees centigrade in a spray drying chamber. Then, the core may be further processed by mixing with a polymer, and the core may be coated with a slip layer of a polymer. Then, the slip layer of the polymer, which may be referred to as a "slip layer," herein, may produce a polymer derived ceramic, when the core and slip layer are pyrolyzed. The slip layer may be the same polymer derived ceramic as the polymer derived ceramic phase in the composite core. Alternatively, a different polymer derived ceramic may be selected for the slip layer. The thickness of the shell may be tailored by controlling the viscosity of the polymer when mixed with a plurality of the cores and by the choice of processing steps following mixing. Slip layers may be added and dried repeatedly in an automated process that provides a layered shell or by a coating with an atomized layer of polymer during coating of a fluidized collection of beads suspended within a fluid stream, for example.

Collectively, a plurality of slip layers or a built up slip layer, over time, may form a single ceramic shell when pyrolyzed or a plurality of ceramic shells may be tailored for particular attributes, such as resistance to fracture closure stresses and/or hardness and/or toughness and/or fatigue resistance. In one example, the shell forms from a plurality of a layers. For example, a tough layer, such as a plastic, crack blunting material may be interspersed with a hard layer, such as a ceramic material. The layering may mimic natural protective shells, such as those of marine life, for example.

For example, the cores may be separated into individual beads, such as by spray drying or emulsion forming or any other process capable of forming bead-like core particles, prior to pyrolyzing the beads at a pyrolyzation temperature, such as 400 degrees centigrade or greater, more preferably at a temperature selected in a range from 600 degrees centigrade to 1000 degrees centigrade, forming a solid or nearly solid outer shell on a composite core comprising coal dust/polymer derived ceramic, wherein the core may contain substantial porosity, without unnecessarily adversely affecting the crush strength or fracture compression stress resistance of the ceramic composite proppant.

A fraction or percentage of coal dust to coal dust and polymer, by weight, may be selected for the composite core. For example, a fraction of coal dust may be selected in a range from about nine-tenths to about six-tenths of the total coal dust and polymer, by weight, more preferably the percentage of coal dust to combined coal dust and polymer is selected to be from 80% to 60% coal dust by weight, within the core, prior to heating the core, resulting in a significant reduction in density and cost of the core material. The shell may comprise a thin ceramic film, such as a 0.1 micron film or a thicker coating may be applied to the core, greater than 0.1 microns. In one example, a thickness of the slip layer coating of a pyrolyzed ceramic bead is selected from 1% to 20% of the particle's effective diameter, even more preferably from 5% to 15% of the particles' effective spherical diameters. The thickness of the ceramic coating may be tailored as a trade-off between cost and fracture closure strength resistance of the composite ceramic beads, for example.

In one example, the ceramic beads comprise porosity, further reducing the density below the density of a mixture of the carbon and binder or polymer derived ceramic materials. It is believed, without being limiting in any way, that increasing porosity will decrease the compressive strength of the ceramic beads. However, porosity at the core of a ceramic bead has less effect on the crush strength of a ceramic composite bead than porosity at the outer shell. Thus, coal dust-polymer derived ceramic beads may be tailored having a wide range of resistance to crushing by fracture closure stresses, cost, sphericity/roundness and density. These parameters may be selected by processing steps, ratios of binder to coal dust for the core, and selection of the type of coal dust and particle size. It is thought, without be limiting in any way, that chemical processors occur during pyrolyzation of the core, resulting in outgassing that can form porosity.

For example, a roundness or sphericity of the ceramic beads may be at least 0.9 after processing of the beads. A cost of the beads may be less than one-half U.S. dollar per pound, more preferably less than U.S. $0.25 cents per pound. For example, the ceramic beads, when added to a proppant, are capable of withstanding closure pressures of at least 6000 pounds per square inch (psi), more preferably at least 7000 psi, even more preferably at least 8000 psi, yet more preferably at least 10,000 psi. In one example, the specific gravity (compared to water) is no greater than 2.6, more preferable no greater than 2.5, even more preferably no greater than 1.5, still more preferably about 1.0, such that the ceramic beads remain suspended in and carried along with a proppant fluid having a density similar to water, and at a concentration such that the viscosity of the fracking fluid is not unreasonably elevated by the addition of the proppant.

Figure 14:
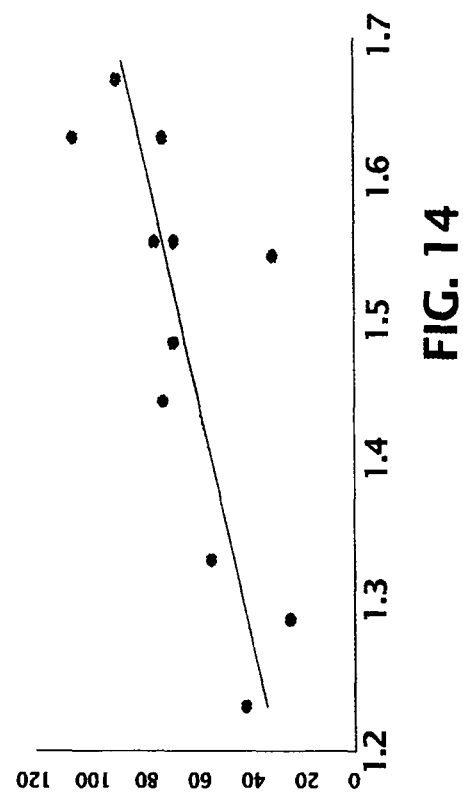
FIG. 14 shows a graph of flexural strength in MPa versus density in g/cc of composite test bars made of coal-polymer derived ceramic precursor beads after pyrolyzation of the test bars.
Figure 15:
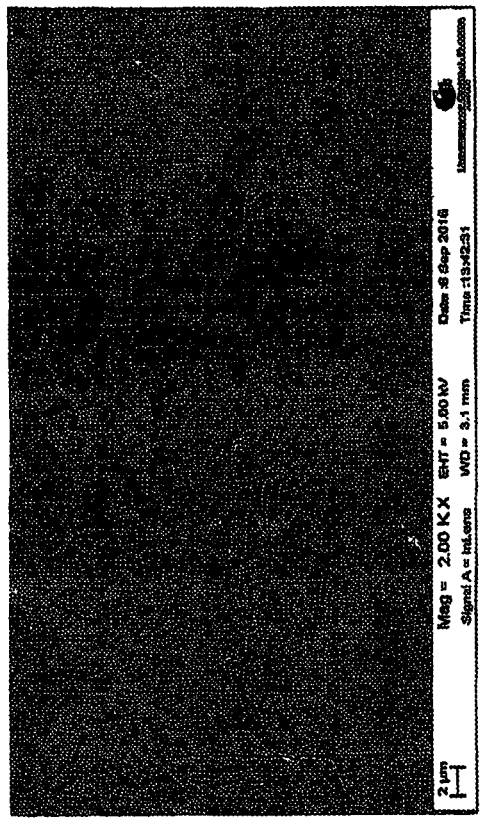
FIGS. 15(*a*)-(*b*) show (a) results for testing of a coal dust-polymer derived ceramic test bar and (b) an image of a resulting amorphous phase.

For example, composites made from consolidating a variety of beads and pyrolyzing the composite demonstrates a flexural strength as shown in FIG. 14. The graph shows flexural strength in MPa versus density in g/cc of composite test bars made of coal-polymer derived ceramic precursor beads after pyrolyzation of the test bars. Pressing the green body at higher consolidation pressures increases flexural strength and density. FIG. 15(a) shows some properties of an example of a 100 mm×7 mm×7 mm test bar made of coal-polymer derived ceramic beads. The results are surprising and unexpected, as is the glassy microstructure shown in FIG. 15(b) in which some porosity is evident. It is thought, without being limiting in any way, that the coal particles chemically react and bind with the ceramic matrix binder forming an amorphous material. Surprisingly, without being limiting in any way, the process may produce fullerenes, nanotubes and/or nanofibers in situ during the pyrolyzation step. It is thought, without being limiting in any way, that iron or preexisting nanostructures may be important in the growth of these structures during pyrolyzation. It is known that there is hydrogen available in the sub-bituminous and bituminous coal used in some of these examples, which could produce an environment, locally, suitable for fullerene, nanotube and/or nanofiber growth.

Figure 1:
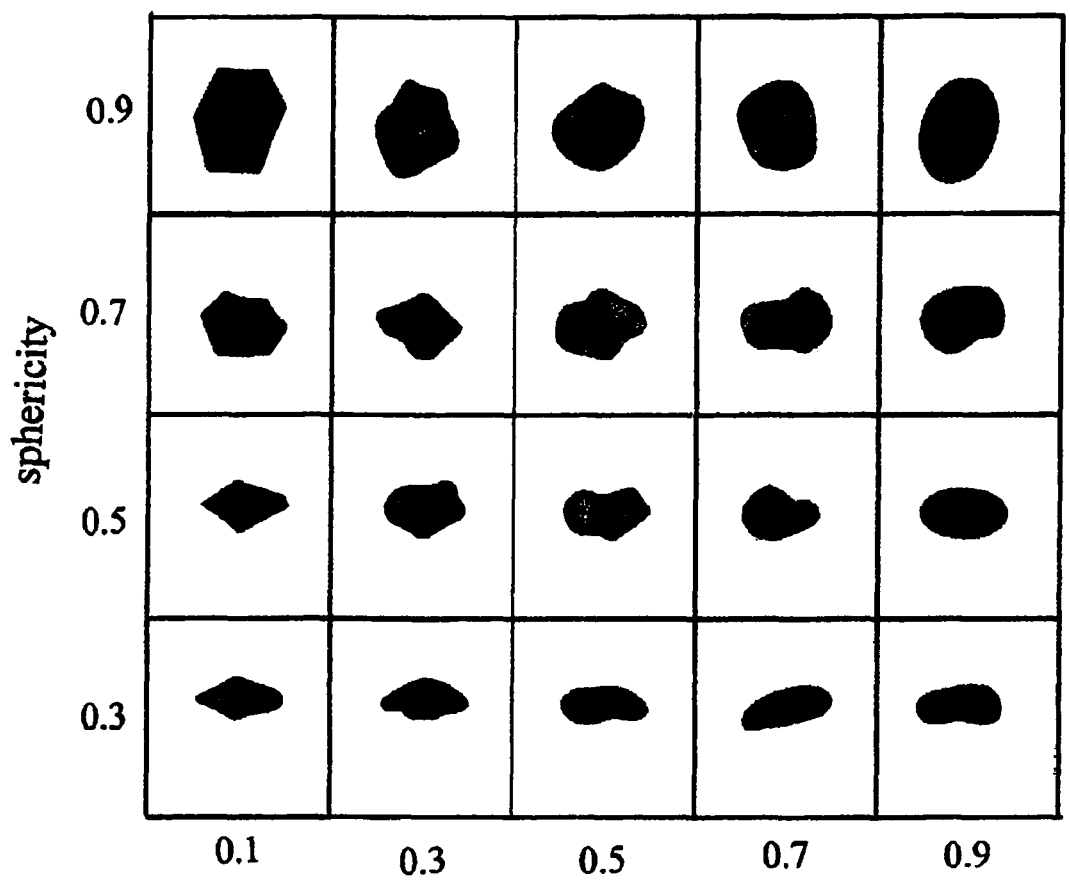
FIG. 1 discloses a prior art graph for determining sphericity and roundness, according to a standard for fracking proppants, such as fracking sand.
Figure 2:
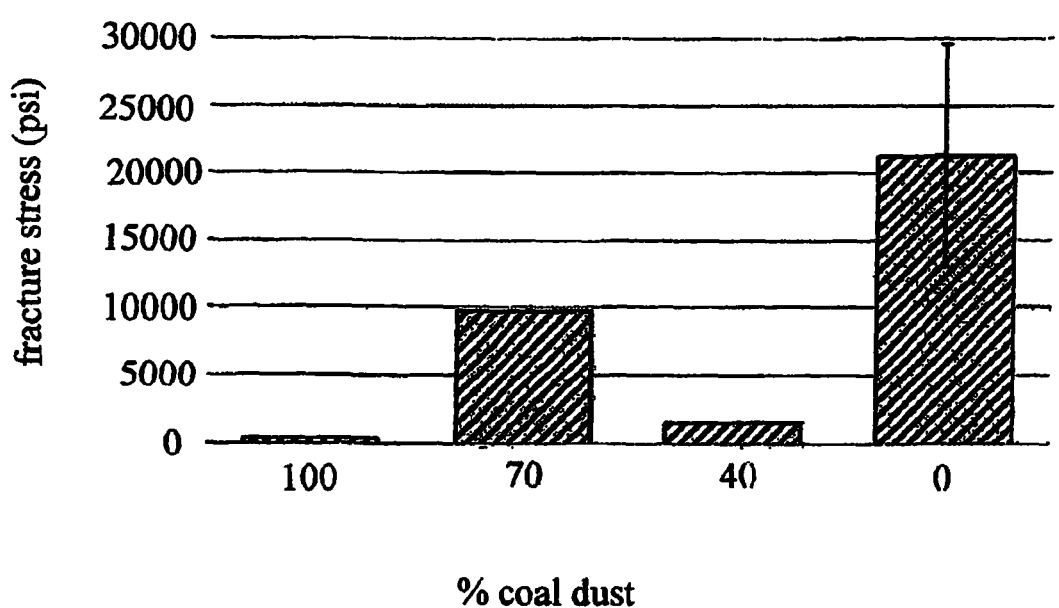
FIG. 2 is a graph showing data for fracture stress resistance for various coal dust compositions in coal dust-polymer derived ceramic composite beads.

For example, a polymer derived ceramic may comprise a polysiloxane, polysilazane, polyborosiloxane, polycarbosiloxane, polyborosilane, polycarbosilanes and combinations of any two or more of these, with or without other additives. In one example, a precursor for the polymer derived ceramic is mixed with a low-cost filler, such as coal dust. In one example, a critical range for the low-cost filler, such as coal dust, comprises a fraction of coal dust to polymer derived ceramic in a range from no greater than 9 parts coal dust to 1 part polymer derived ceramic to no less than 6.5 parts coal dust to 3.5 parts polymer derived ceramic, by mass. Preferably, the fraction of coal dust is greater than 6 parts coal dust to 4 parts polymer derived ceramic. Surprisingly, a core having greater than 6 parts coal dust to 4 parts polymer may have a greater fracture resistance than a core with less coal dust, as shown in FIG. 2, for example.

For example, a carbon-based, organic material, such as a source of coal, may be pulverized into a dust. The coal dust may be separated into different particle sizes, such as by passing the coal dust through a sieve or sieves. Sequentially sieving the coal dust through a series of sieves gives an indication of the coal dust particle size, For example, a No. 270 sieve has openings of 53 microns, a No. 325 sieve has openings of 44 microns, and a No. 400 sieve has openings of 37 microns. Therefore, each successive sieve traps particles larger than the opening size through the sieve. If the particles are not spherical, then the sieve opening usually reflects the second maximum dimension of the particles, i.e. not the length but the width of a particle. For example, coal dust particles having an equivalent diameter of 40 microns might pass through a No. 400 sieve, if non-spherically elongated in one direction and less than 37 microns in its other dimensions. Also, a sieve may be used for screening out larger particles or agglomerations of particles prior to mixing with a polymer. Coal dust that passes through a 37 micron sieve may be utilized in composite beads or composite bead cores having equivalent diameters from 150 microns and greater, more preferably 200 microns to 2000 microns, even more preferably 400 microns to 800 microns, for example. Ultracentrifuges and other techniques may be used to separate out particles smaller than sieves with the smallest available holes, for example, and other techniques may be used to characterize particles, even down to a few microns. Synthetic forms of carbon may be utilized (usually at a higher cost) if available. For example, graphite powders may be available already sifted to very small particle sizes. The type of carbon powder utilized may affect the porosity and density of the core and may have an adverse or beneficial impact on the cost, fracture stress resistance, sphericity/roundness and density of carbon-polymer derived ceramic beads.

In one example, a coal dust may be mixed with a polymer, such as a polymer to ceramic material. For example, a polymer to ceramic material may be selected from Starfire Systems, such as an SPR212, which forms a silica carbide ceramic upon heating in a tic process. Alternatively, a polymer may selected to form other ceramic materials including a metal or rare earth and oxygen, carbon, nitrogen, boron or combinations of oxygen, carbon, nitrogen and boron, for example. For example silicon may form a ceramic with carbon (SiC) or with oxygen (SiO) or with carbon and oxygen (SiOC). Ceramics may be comprised of oxides, carbides, borides, nitrides and the like. The resulting ceramic and the properties of the ceramic will depend, significantly, on the processing used to produce the ceramic or ceramic composite beads.

In one example, a nonsolvent, such as water or other non-dissolving fluid, is added to form a slurry of the coal dust and polymer, and the polymer may be dissolved in a solvent or may be present as polymer particles or as a liquid polymer at the temperature of the bead formation. For example, a slurry may be formed into small droplets, which partially cure to form beads, such as by drying and/or heating the beads as the beads are formed. For example, beads with mean particle sizes selected in a range from 100 microns to 2 millimeters may be formed having a sphericity of 0.9 or greater. The partially cured beads may be fully solid or may have porosity from volatilization of a solvent, a reaction product or a nonsolvent. In one example, the amount of solvent or nonsolvent is selected to control the amount of porosity in the bead, tailoring the density and crush strength of the bead. In one example, the polymer may be dissolved or partially dissolved in a solvent, and the polymer solvent may be a nonsolvent to the carbon dust. Alternatively, an additional nonsolvent may be added to reduce the viscosity of the mixture of solvated polymer and coal dust. For example, ceramic beads may be formed having bead sizes from 30 to 100 microns, if coal dust size is selected to be no greater than 3 microns. More preferably, median bead particle size (pd50) is selected to be in a range of 50 to 2000 microns, depending on the specifications required by the fracking industry. In one example, a 30 micron bead is formed by mixing very fine coal dust, 3 microns or smaller, with a polymer used for creating a polymer derived ceramic and a solvent. The mixture is sprayed through a nozzle into a spray dryer forming nearly spherical beads. The beads are pyrolyzed, such as at a sis temperature of 1000 degrees centigrade and in a non-oxidizing atmosphere, wherein an irreversible chemical reaction occurs. Hydrates, water vapor and volatile organic compounds are volatilized from the coal dust and polymer of the bead during hearting, drying and sis, resulting in a porosity in the core of the bead, reducing the density of the bead to less than 1.5 g/cc, in one example, more preferably less than 1.2 g/cc. In one example, the mean sphericity is no less than 0.9 and the mean roundness is no less than 0.9. The sphericity of coal dust is not particularly important to the sphericity of a composite bead made from a plurality of coal dust particles and a polymer derived ceramic. Preferably, each ceramic bead comprises at least 10 coal dust particles and has a sphericity and roundness no less than 0.9.

In one example, a process includes a spray dryer. A spray drying process may comprise a nozzle, such as a sonic, acoustic and/or electrostatic nozzle. The orifice and type of the nozzle may be selected to output particles of a defined size range and sphericity/roundness. In some nozzles, mixing may occur at or immediately adjacent to the nozzle, allowing the coal dust to be fed into one inlet and the polymer at a second inlet. The composite beads are emitted from the nozzle upon mixing of the two feed stocks. For example, the temperature and atmosphere in a drying chamber may be controlled to cure the beads, partially or completely, by conventional heating elements or electromagnetic waves, for example. Waves of any frequency may be provided to impart heat or to directly cure the polymer, such as infrared waves, microwaves, ultraviolet light, x-rays or the like. The resident time in the drying chamber may be shorter or longer depending on the rate and degree of curing and drying desired. sis may occur in the drying chamber or may be completed after the beads are removed from the chamber or in a subsequent chamber, in a continuous or batch process. Alternatively, the beads may be defined as having a core distinct from the outer layer or layers of the beads, by further processing. For example the core may be mixed with a polymer, such as a polymer derived ceramic polymer, which may be the same or different than the polymer derived ceramic polymer of the core. The core may be pyrolyzed (i) to completion, (ii) for the first time or (iii) for a second time, after being dried and coated with the polymer derived ceramic layer. In one example, the core is partially dried, and would be tacky to the touch, when a slip layer of a polymer for an external polymer derived ceramic coating is applied to the core. Alternatively, after being coated, the bead may be processed through a nozzle and/or a drying chamber and/or an emulsion to separate the beads and cure the coating, prior to or at the same time as the beads are being pyrolyzed.

FIG. 2 shows a fracture stress comparison for bead cores for four different percentages of coal dust in the core. The 0% coal dust is data derived from polymer derived ceramic beads, and the error bar shows a range of fracture stress from low to high based on choice of polymer and processing parameters. The fracture stress of the 70% coal dust-polymer derived ceramic was especially surprising and unexpected, almost achieving a 10,000 psi fracture stress for a core at. The density of polymer derived ceramic is about 2 glee. The density of coal dust is about 0.6 g/cc, depending on the type of coal, and bulk density of coal may be as high as 0.93 glee. However, a pyrolyzed mixture of coal and polymer derived ceramic my have a substantially different density than the constituents, due to volatile gases and processing differences. The data points in FIG. 2 are for beads having a density of 2.0 to 2.1 glee (0% coal dust) and a bulk density of 1.27 g/cc (70% coal dust) was measured from a rod formed of compacted beads that was then pyrolyzed, by measuring the mass and volume of the rod; and a bead made from only coal dust is assumed to have a density less than 0.93 g/cc (highest bulk density for coal) and probably much less. The density of the beads with 40% coal dust, which were made by emulsion processing, has not been measured, yet. The density is probably less than 1.27 g/cc, but the density difference cannot account for the significant difference in comparative fracture stress resistance. Ordinarily, one would predict that both the density and comparative fracture stress would be inversely proportional to the percentage of coal dust; however, the data shows a substantial variation in comparative fracture stress with the choice of polymer precursor, percentage coal and processing parameters for a bead core that defies conventional assumptions. This provides opportunities for tailoring properties of proppant beads made of a composite of coal dust and polymer derived ceramic, because the data for 70% coal dust has a very favorable density, fracture stress resistance, sphericity, roundness and cost that make it attractive as a proppant, meeting or exceeding industry requirements.

In one example, the 70% coal dust-30% polymer derived ceramic composite bead was formed by mixing together 7 parts by weight of coal dust (approximate particle size of 3-5 microns) with 3 parts by weight of a polymer derived ceramic precursor, such as an SPR212 or other polymer capable of being pyrolyzed to form a ceramic. Additionally, chloroform, a solvent for the polymer, was added at 1 part chloroform to 1 part of the mixture by volume, producing a slurry. The slurry was emulsified to produce beads that were partially cured at a temperature of 50 degrees C. for 30 minutes. The beads were transferred to a retort furnace under an atmosphere of dry nitrogen for 600 minutes at room temperature and ramped to 1000 degrees centigrade over ten hours, causing sis of the polymer to form a ceramic. The composite bead particle size was estimated to be 400 microns. Without being limiting in any way, it is believed that the polymer derived ceramic acted as a binder for the coal dust particles. For example, the composite ceramic beads in the example disclosed in FIG. 2 are likely to meet or exceed industry requirements for a proppant.

In another example, a 40% coal dust-60% polymer derived ceramic composite bead was formed by mixing 4 parts by weight of coal dust (approximate particle size of 3-5 microns) with 6 parts by weight of a polymer derived ceramic precursor, such as an SPR212 or other polymer capable of being pyrolyzed to form a ceramic. Additionally, chloroform, a solvent for the polymer, was added at 1 part to 2 parts of the mixture by (weight/volume), producing a slurry. The slurry was emulsified produce beads that were (dried/partially cured) at a temperature of 50 degrees C. for 30 minutes. The beads were transferred to a retort furnace under an atmosphere of dry nitrogen for 600 minutes at room temperature and ramped to 1000 degrees centigrade over ten hours, causing sis of the polymer to form a ceramic. The composite bead particle size was estimated to be 400 microns. Without being limiting in any way, it is believed that the polymer to ceramic material comprised a matrix, and the coal dust may have introduced defects and voids into the matrix, such as by outgassing from the coal dust and evaporation of (solvent/nonsolvent) during sis. In the example show in FIG. 2, the resulting composite beads failed to meet industry requirements for a proppant.

Before conducting the experiments, one would have assumed that any process and any percentage of coal dust less than 90% coal dust could have at least met the industry standards for a proppant, but the results of experiments have shown that less coal dust does not necessarily result in a higher comparative fracture stress, which is one of the most critical requirements that any fracking proppant must meet.

More generally, proppants may be made by a variety of processes, provided that the polymer to ceramic phase acts, preferably, as a binder between coal dust particles, and with a range of coal dust percentages, provided that the coal dust particles and any porosity introduced during processing do not become defect sites undermining the composite bead's resistance to fracture stress. Whether or not such defects exist will depend on processing conditions, coal dust particle size, solvent/nonsolvent characteristics, the fracture stress and toughness of the polymer to ceramic phase and whether the evolution of a vapor phase during sis adds porosity to the composite beads.

Figure 3:
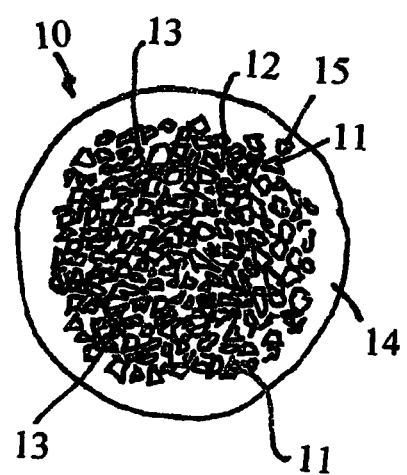
FIG. 3 illustrates a cross section of an example having a core and a coating, wherein the core comprises coal dust particles and the coating is substantially free of coal dust particles.
Figure 6:
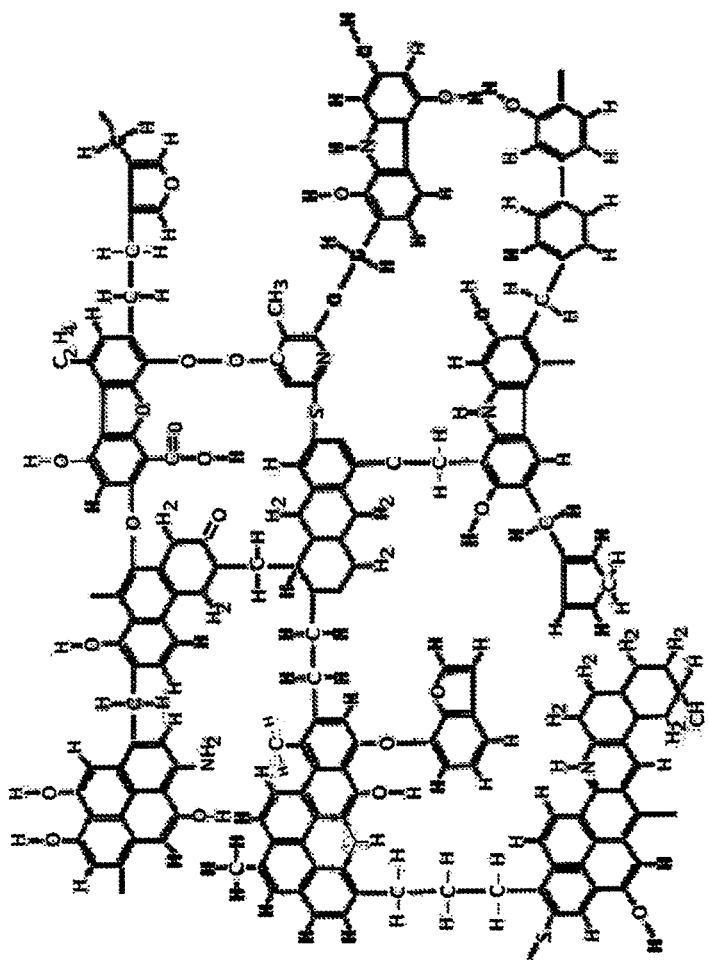
FIG. 6 illustrates an example of a chemical symbol for one type and source of coal in the prior art.

FIG. 3 illustrates, schematically, an example of a composite ceramic bead comprising a plurality of coal dust particles 11, which may be substantially non-round and non-spherical, a polymer to ceramic phase 12, which may act as a binder, a plurality of pores 13, forming closed porosity or interconnected, open celled porosity, within the polymer to ceramic phase, and a coating 14, which may be a slip layer, substantially free of coal dust. As shown, the core coal dust-polymer to ceramic portion of a bead may be non-spherical and non-round, and the slip layer may increase the sphericity and roundness of the bead. Also, the bead core may have a substantially lower fracture stress than the bead shell, the shell providing the greatest contribution to fracture stress resistance of the bead. Thus, the bead may comprise a core including up to 90% by weight coal dust to polymer derived ceramic, while the composite bead meets or exceeds industry requirements for a proppant. The representation in FIG. 3 shows a coal dust particle that separated from the core and found its way into the shell; however, the presence of an isolated coal dust particle 15 or even several coal dust particles within the slip layer has little effect on the fracture stress resistance of the composite bead, provided the slip layer is substantially free of coal dust, meaning that the slip layer comprises less than 10% by weight of coal dust to polymer derived ceramic and coal dust particles do not extend beyond the surface of the polymer to ceramic slip layer. The addition of a slip layer 14 may improve, substantially, the sphericity, roundness and fracture stress resistance of a composite bead, even if a composite core of the bead would not have met industry requirements for a proppant.

Figure 5:
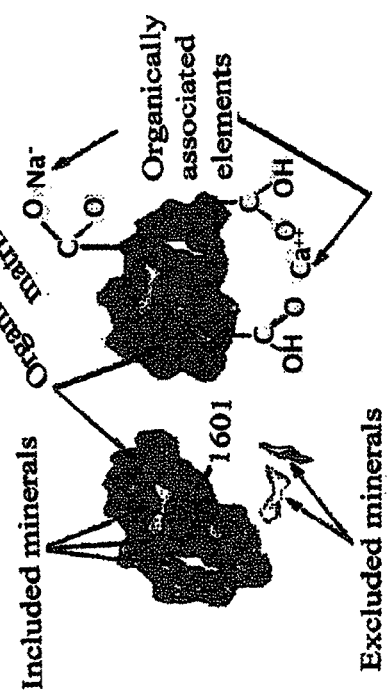
FIG. 5 schematically illustrates a prior art conception of coal particles.
Figure 8:
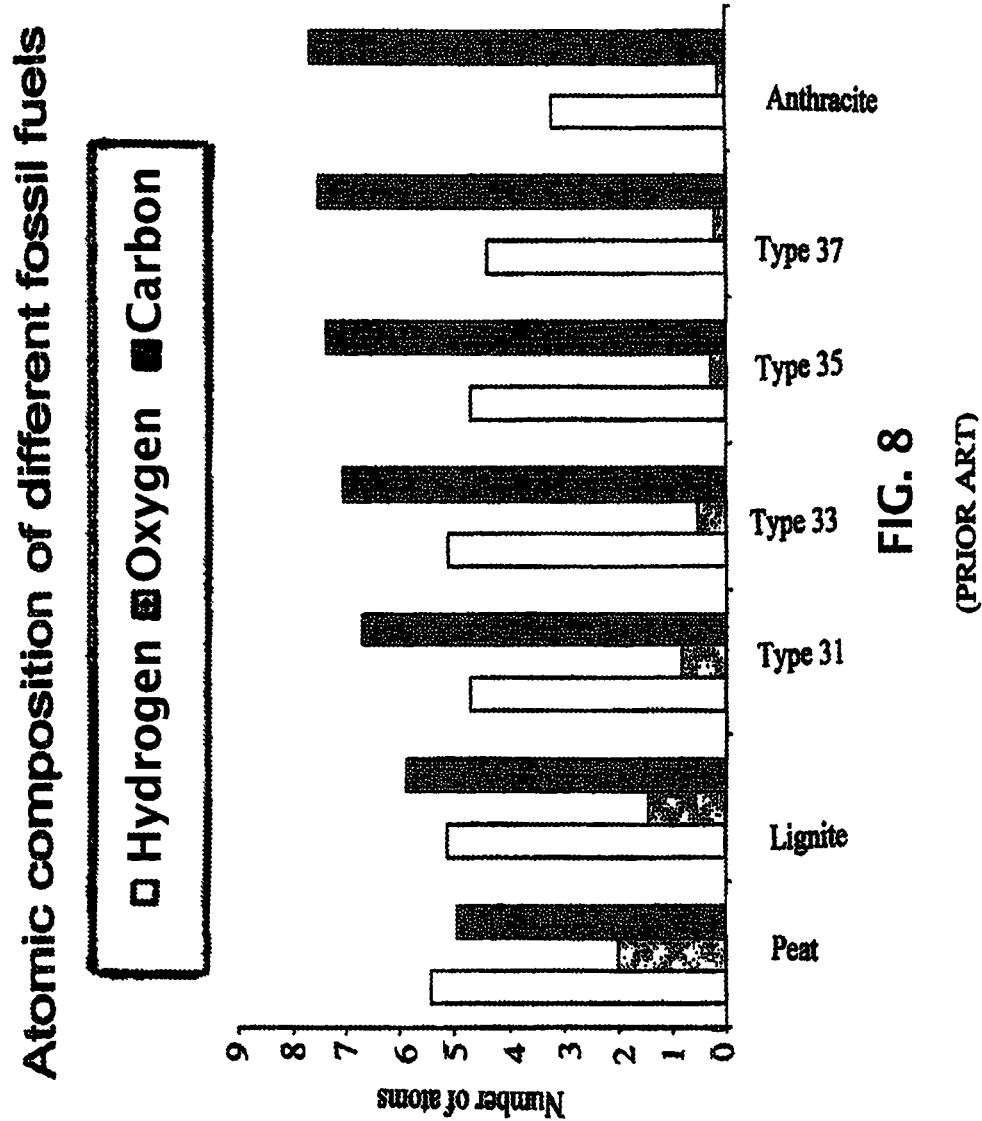
FIG. 8 illustrates a prior art comparison of different coal broken out by different recognized types of coal, showing a significant variation in hydrogen, oxygen and carbon.
Figure 16:
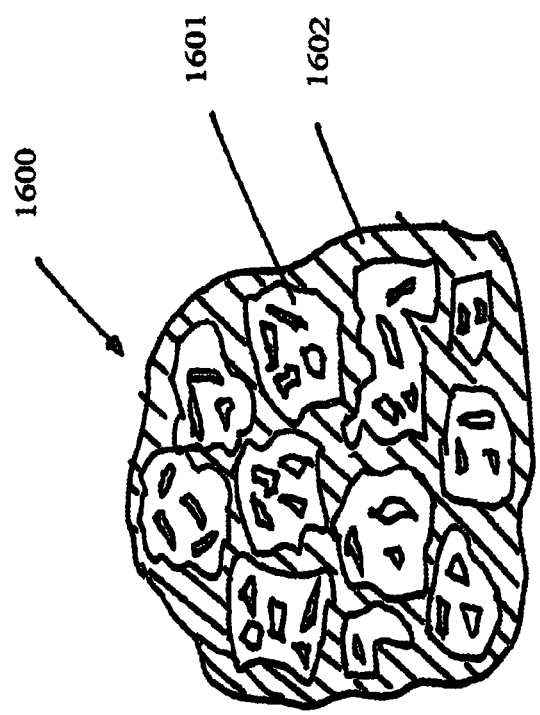
FIG. 16 schematically illustrates a cross section of a coal dust-binder bead with the binder shown by cross hatching.
Figure 17:
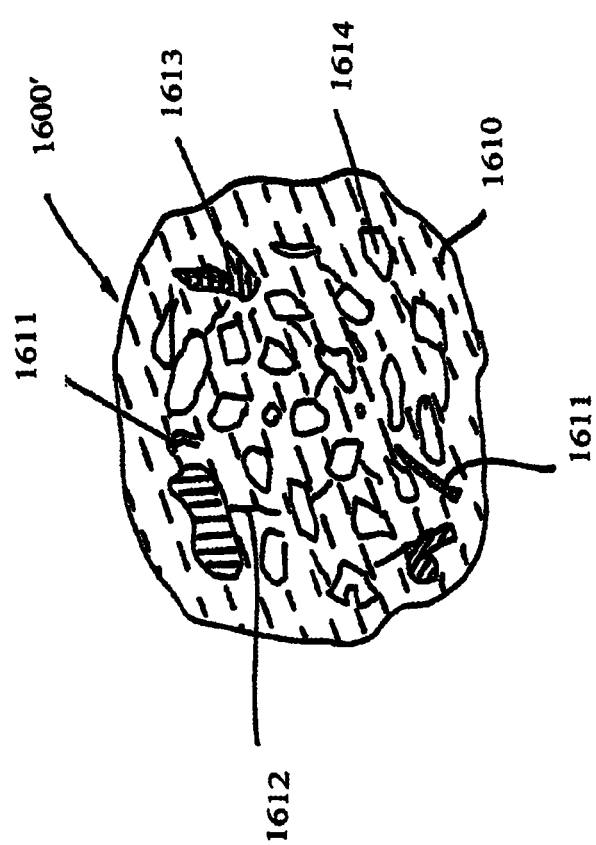
FIG. 17 schematically illustrates a cross section of a pyrolyzed coal-dust-polymer derived ceramic bead with dashed lines showing an amorphous phase.

FIG. 16 illustrates a bead 1600 formed by coal particles 1601, such as illustrated in FIG. 5, and a binder 1602. The binder:coal particle ratio may be any of the ratios disclosed, and the relative proportions in the drawing are merely an example. If the binder is a polymer derived ceramic precursor, then the cross sectional microstructure after pyrolyzation may resemble the schematic illustration in FIG. 17, for example. FIG. 17 shows a pyrolyzed coal dust-polymer derived ceramic bead 1600' with an amorphous matrix phase 1610 and inclusions, such as inorganic inclusions 1613, nanotubes/nanofibers 1611, and porosity 1614. The porosity 1614 may be interconnected or closed.

Figure 18:
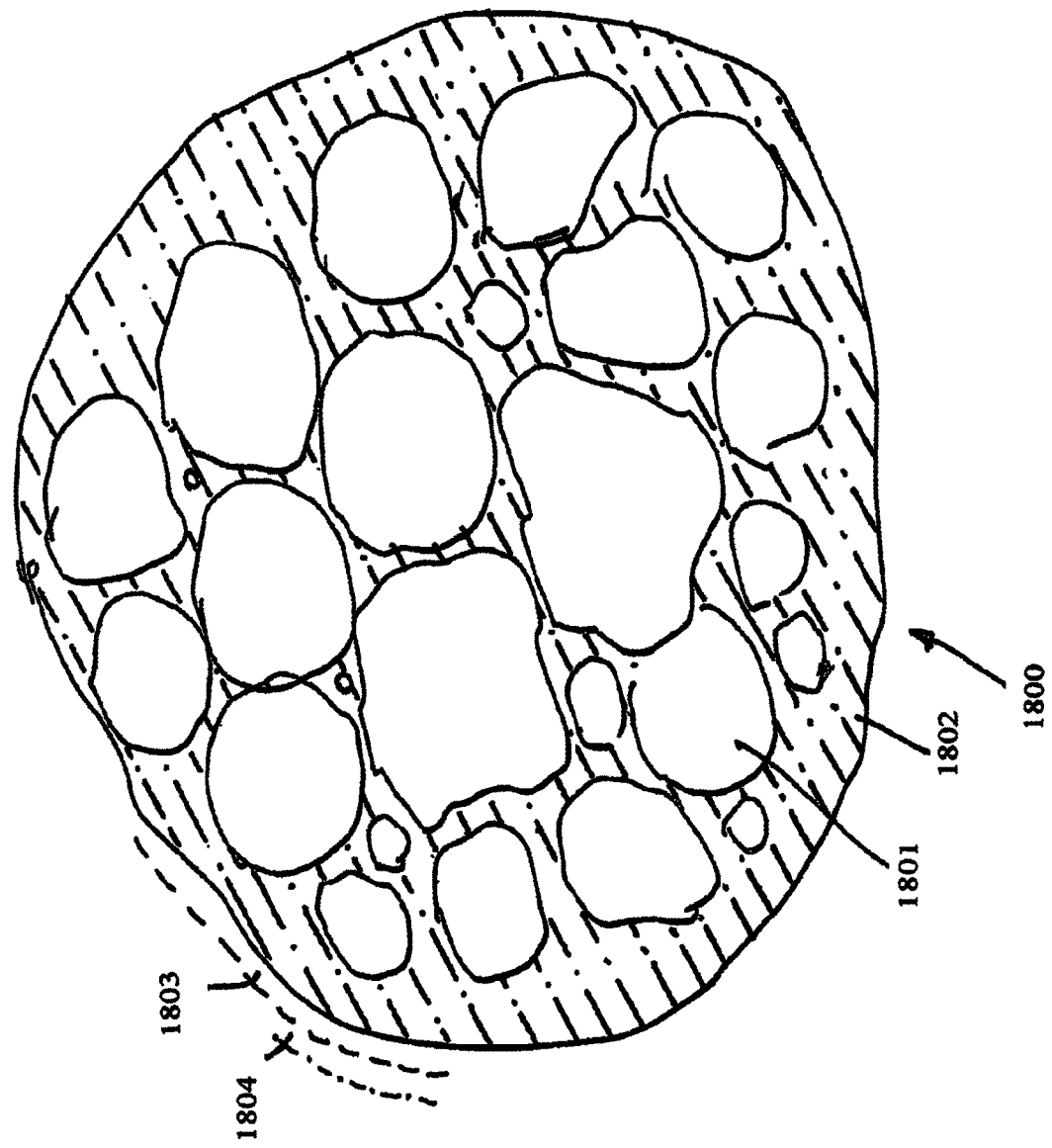
FIG. 18 schematically illustrates a complex ceramic particle formed of a plurality of coal dust-binder beads with a matrix.
Figure 19:
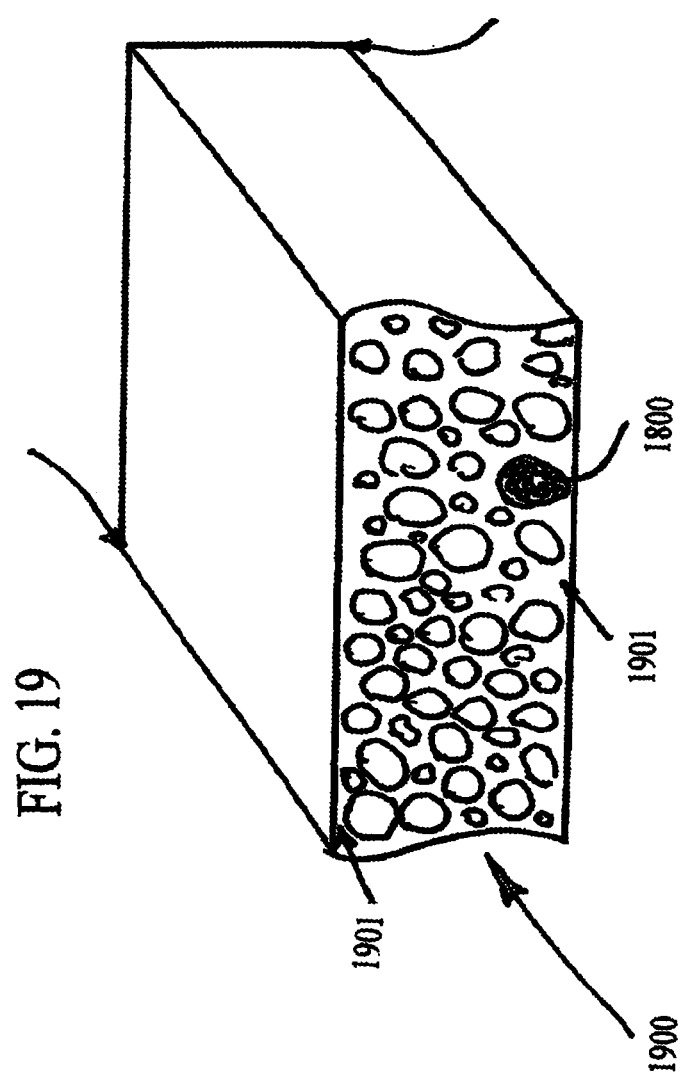
FIG. 19 schematically illustrates a complex ceramic particle composite formed from a plurality of complex ceramic particles within a matrix.
Figure 20:
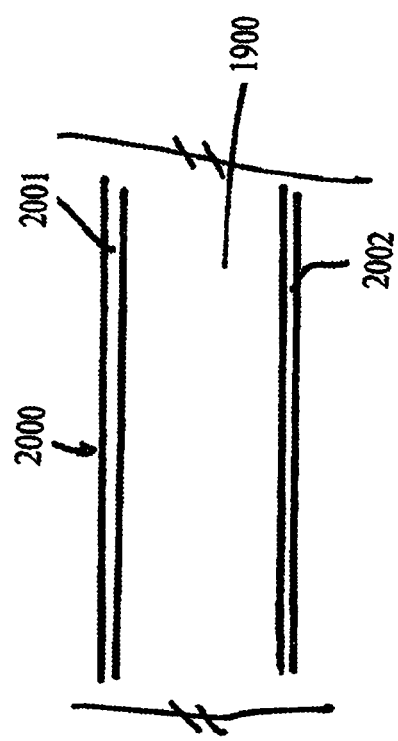
FIG. 20 schematically illustrates a structure comprising the complex ceramic particle composite incorporated into the structure.
Figure 21:
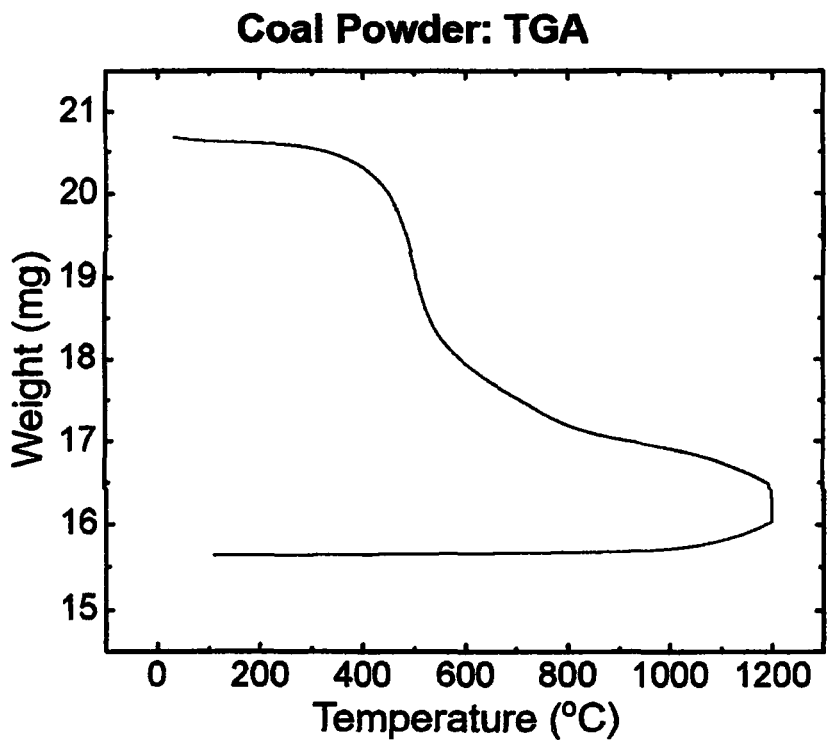
FIG. 21 shows a graph of a thermogravimetric analysis.
Figure 22:
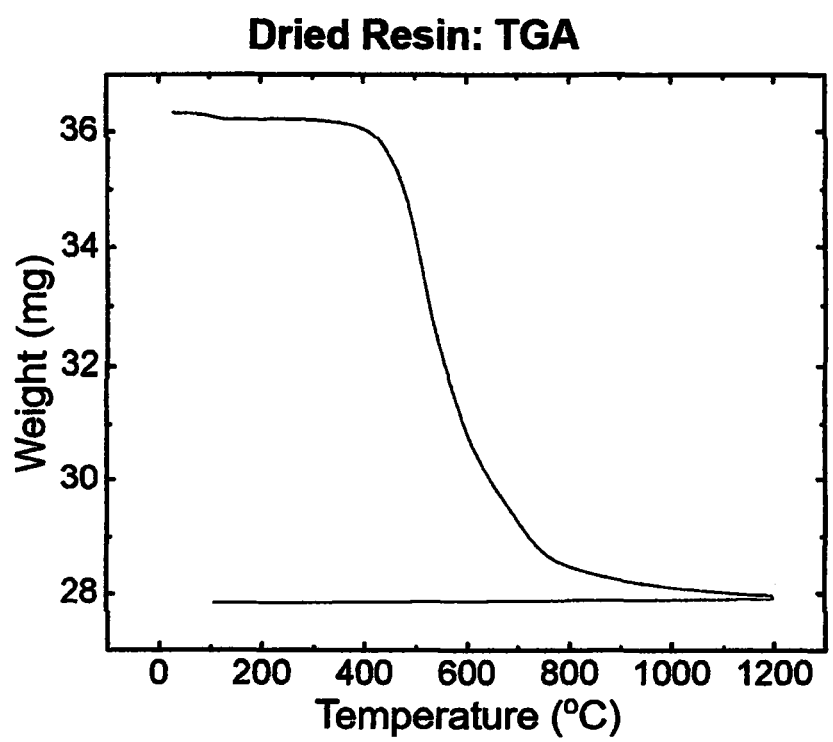
FIG. 22 shows a graph of another thermogravimetric analysis.

In FIG. 18, a complex particle is formed of a plurality of coal dust-hinder or coal dust-polymer derived ceramic beads 1801 within a matrix 1802, for example. The matrix 1802 may be any material. In one example, the matrix is formed from a coating applied to the beads 1801. For example, the complex particle 1800 may have a slip layer or slip layers 1803, 1804 applied to its surface. In FIG. 19, a plurality of complex particles 1800 are consolidated in a composite body. The composite body 1800 may be any composite body and take on any shape with any thickness. In one example, the composite body is formed by three dimensional printing by spraying or depositing the complex particles 1800, such as by suspending them in a fugitive carrier fluid. In FIG. 20, the three dimensional shape of the composite body 1900 is part of a composite structure 20. The composite structure comprises a composite body core 1900, a first surface layer or layers 2001 on one surface and a second surface layer or layers 2002 on an opposite surface.

The beads 1600, 1600' may be used to make larger complex particles 1800 that may be consolidated and compressed, for example, at a high pressure, to form a complex particle body 1900 of a composite structure 2000, for example. The beads 1600, 1600' may be pre-processed to add a sealing layer on the beads before incorporating the beads into a complex particle 1800, for example. The sealing layer may be any material that prevents or reduces penetrating of the matrix phase 1802 into the pores in the beads 1600, 1600', for example. Alternatively, the pores may be intentionally filled by a pore filling material, preferably one that wets the surfaces of the beads in order to reduce porosity. The pore filling material may be low density and/or a ductile crack arrestor, for example.

Polymer derived ceramics, PDC's, may be oxide and/or non-oxide PDC's, such as SiC, SiOC, HaC, BC, and the like and/or nanoparticles of metal oxides such as $SiO_2$, $Al_2O_3$, and $Fe_2O_3$ and the like, and/or nanoparticles of clays such as Kaolinite, Illite, Calcite or Pyrite and the like, and/or nanofibers and/or nanotubes of carbon, silicon, silicon carbide, silicon oxycarbide and the like, which may be added or grown in situ, and/or nanosheets of graphene and/or nanodomains of graphitic carbon. These constituents may be bonded together chemically by thermal sis to form a nanoporous bead, particle or bulk material, for example. After being mixed together, or as they are being brought together (three dimensional printer mixing constituents together on the fly), prior to thermal sis, the constituents may be fabricated into complex three-dimensional parts. For example, three-dimensional printing, extrusion, rolling, molding and other forming processes may be used to create three-dimensional green bodies. The fabricated parts would then be cured to a rigid green part which may be thermally pyrolyzed to produce a ceramic nanocomposite part.

Two main sources of the constituents are polymer derived ceramics (PDC's) and coal. PDC's are a type of ceramic that is derived from a liquid or solid polymer precursor which is cross-linked or cured into a solid material which is then pyrolyzed at high temperatures which converts the polymer into a ceramic. For example, the ceramic matrix and coal dust may form an amorphous phase within coal-ceramic particles. A plurality of coal-ceramic particles may be agglomerated into a complex composite particle. Ceramics, such as SiC, SiOC, HaC, BC, may be produced from polymer precursors. Depending on the desired final properties, a powdered coal may be mixed with a liquid PDC resin in amounts that could range from 1 wt % PDC resin and 99 wt % coal all the way to 99 wt % resin and 1 wt % coal. However, for most applications, the range would be much narrower.

Once coal and liquid resin are thoroughly mixed and beads are formed, a structure may be formed from the beads and may be molded, rolled, extruded, three-dimensionally printed, sprayed, dipped or otherwise processed into complex shapes or coatings. The shapes or coatings would then be cured to a rigid material. Pyrolyzation in a furnace, under inert atmosphere to 800 C to 1500 C, depending on the PDC system being used, can turn the green body into a ceramic nanocomposite. The resulting ceramic nanocomposites possess high strength, high stiffness, high toughness, and high temperature resistance as well as other surprising and unexpected properties, such as electrical conductivity and selectable thermal expansion properties, among others. The unique nanostructure produced by the processing of particles to beads to complex particles to three-dimensional structures is enhanced by chemical processes that occur during the sis. At the beginning of the sis transformation in the temperature range of room temperature to 150 degrees C., moisture in the coal powder evaporates. This process produces nano pores within the coal particles and/or coal-binder or coal-PDC bead. In the temperature range of 400 degrees C. to 600 degrees C., volatile low molecular weight aromatic and aliphatic hydrocarbons, such as benzene and methane evaporate, which further increases nano porosity. Also in this temperature range, PDC resin starts its transformation to ceramic. This also involves the evolution of gases such as methane, CO and $CO_2$. An important structural transformation also starts in this temperature range. There are many different trace elements present in coal, such as nickel, tin, iron and the like. For example, the mineral pyrite, $FeS_2$, is in sources of coal tested. At these temperatures, pyrite decomposes into elemental iron and sulfur gas. Sulfur gas dissipates leaving elemental iron, which may be present on the surface of the coal particles and on inner walls of newly formed nanopores within beads. Nickle and iron both catalyze formation of fullerenes, carbon nanotubes and nanofibers from methane and other low molecular weight hydrocarbons within the nanopores. At this point there are methane and hydrocarbon gases being generated from the decomposition of the coal and PDC resin. These gases may be flowing through the nanopores. As these gases find elemental nickel and iron, in situ growth of fullerenes, graphene, nanotubes and nanofibers, such as of carbon, silicon carbide and like, may spontaneously grow, sometimes as long as hundreds of microns and may attach one to the other or from one particle to another, increasing strength and toughness to a surprising degree.

In one alternative, to further enhance the growth of nanostructures of carbon and the like, nickel and iron salts, such as nickel chloride or iron chloride, or other sources of nickel or iron, may be added to the coal powder in the initial mixing step.

As sis temperature continue to increase, in the 800 C to 1500 C range, another important transformation takes place. The different clay materials such as kaolinite and illite in the coal start to melt and/or decompose. These clays decompose into nano sized particles of $SiO_2$ (silica) and $Al_2O_3$ (alumina). These are the primary constituents of fly ash which is a troublesome by product of the combustion of coal. However, in this technology, the silica and alumina nanoparticles chemically bond/alloy into a ceramic structure through silicon and oxygen bonds formed by the transformation of the PDC resin into a ceramic. In the final phases of sis, most, if not all, of the remaining hydrogen and sulfur are volatized and escape. The resulting nano composite can be viewed as a blend of nanoporous polymer derived ceramic and carbon, such as graphene sheets, tubes, fullerenes and the like, which bond to domains of nanoporous graphitized carbon that has been toughened by the in situ growth of nanotubes, nanofibers and the like. The in situ nucleation of alumina and silica nanoparticles adds to the complex and remarkable structure and mechanical.

In one example, pure PDC resins shrink by 15% to 25% when pyrolyzed. If pure coal was fed, it would shrink by a similar amount, depending on the grade of coal used. In one example, a batch of coal/PDC resin is mixed of one type and in various proportions with a different batch made with a different PDC resin. As an example, a batch of anthracite coal with a PDC resin for silicon oxycarbide ceramic may be mixed with 70 wt % anthracite coal and 30 wt % silicon oxycarbide precursor. A second batch of bituminous coal and a PDC resin for silicon carbide ceramic may be formed by mixing 60 wt % bituminous coal with 40 wt % silicon carbide precursor. Then, the two batches are mixed together in whatever ratio is desired, such as a 50/50 blend of the two batches, comprising a ceramic nanocomposite that has 50% silicon carbide containing and 50% silicon oxycarbide containing micro domains blended homogenously together. Nanocomposites may be bi-scale porous with micro scale pores at the inter-coal-particle scale (between the coal particles) and nanoporous at the intra-coal-particle scale (inside each coal particle). Therefore, each pores may be infiltrated with additional PDC resin of the same or different family, encapsulating in situ nanotubes and nanofibers within micropores and nanopores. In one example, the nanocomposite is pyrolyzed a second time, and the new ceramic forms in the pores with improved strength and toughness from reinforcing nanostructures, such as tubes and fibers.

In addition to proppants, complex composite particles having a size range of 0.01 micrometers to 5 millimeters are used in a variety of applications. For example, when added to polymer-derived ceramics, these complex composite particles improve hardness, strength, oxidation resistance and decrease cost. Fillers other than coal dust may be included such as silica, clay, SiC, boron carbide, glass powder, glass microbeads, silica sand, aluminum hydroxide, magnesium hydroxide, magnesium carbonate, or other metallic carbonates, phosphates, or silicates, and the like. In one example, a sub-bituminous coal is added and substantially reduces costs while maintaining similar properties. Coal dust is added in at least 1 wt % of the complex composite particle, which enhances properties due to certain chemical reactions, and fillers and constituents may be added to control other properties of the composite, such as coefficient of thermal expansion and the like. Preferably, at least 20 wt % is coal dust, more preferably, at least 40 wt %, such that a substantial fraction of complex particles include in situ growth of fullerenes, nanotubes and/or nanofibers. In one example, a different ceramic forming polymer (such as one with a higher viscosity) is utilized to provide a "seal-coat" on the outer shell of the complex composite particle. For example, this may keep water out of the pores and decrease the effective density, as well as toughen the particle or proppant.

In one example, an organic resin with controlled viscosity is used as a "seal coat" on the particle to keep water out and improve toughness, such as an epoxy, vinyl ester, polyester, polyimide, polyamide, silicone-modified phenolic resin, acrylic, pmma, styrene, dicyclopentadiene, divinyl benzene. For example, an inorganic resin, such as silicone resins or siloxane type resins, provide a seal coat material. In another example, an inorganic resin coating that is composed of one or more of the following materials may be used: a peroxide cured silicone or siloxane resin; a platinum cured silicon or siloxane resin; an amine cured silicone or siloxane resin; a silicone or siloxane cured using an organo-metallic catalyst such as a tin, zinc, or other metal based catalyst. In yet another example, an inorganic resin coating where the silicone or siloxane resin is modified with an organic resin monomer or polymer to improve crosslinking density or other properties is used. The organic monomer or polymer may include one or more of the following, for example: dicyclopentadiene, divinylbenzene, epoxy, polyimide, polyamide, phenolic resin, phenol, formaldehyde, styrene, vinyl ester, any organic diene.

In one example, a proppant or particle comprises coal or coal derived material and a polymer or resin matrix. A polymer or resin matrix may be comprised of phenolic resin (phenol-formaldehyde, or any modification of phenolic type resin); epoxy resin or any modified epoxy resin including siloxane or phenolic modified resins; vinyl ester resins or any derivatives of vinyl ester resins; polyester resins or any derivatives of polyester resins; dicyclopentadiene or any organic diene based resin; divinylbenzene type resins or any divinylbenzene modified resin; any resin modified with dicyclopentadiene or any cyclic dienes. In one example, a proppant or particle comprises a thermoplastic resin, such as polymethylmethacrylate (PMMA), polycarbonate, toughened polycarbonate, PEEK, melamine or melamine modified resins including melamine modified phenolic resins. A proppant or particle may be comprised of a polymer or resin matrix that is the resultant polymer created/or synthesized by the reaction of one or more monomer or short polymer chain siloxanes or silanes with organic monomers or polymers. The organic monomer or polymer reacted with the siloxane or silanes may include one or more of the following: dicyclopentadiene, divinylbenzene, epoxy, polyimide, polyamide, phenolic resin, phenol, formaldehyde, styrene, vinyl ester, any organic diene. A proppant or particle may comprise a polymer or resin matrix of one or more of the following materials: a peroxide cured silicone or siloxane resin; a platinum cured silicon or siloxane resin; an amine cured silicone or siloxane resin; a silicone or siloxane cured using an organo-metallic catalyst such as a tin, zinc, or other metal based catalyst. The silicone or siloxane resin may be modified by either mixing or reacting the silicone or siloxane resin with an organic resin monomer or polymer to improve crosslinking density or other properties. The organic monomer or polymer may include one or more of the following: dicyclopentadiene, divinylbenzene, epoxy, polyimide, polyamide, phenolic resin, phenol, formaldehyde, styrene, vinyl ester, any organic diene, for example. Alternatively, the silicone or siloxane resin is modified by either mixing or reacting the silicone or siloxane resin with other inorganic monomers or polymers such as tetravinyltetramethylcyclotetrasiloxane, tetramethylcyclotetrasiloxane, phenyl silane, diphenylsilane, vinyl-terminated polydimethylsiloxane, hydride terminated polydimethylsiloxane, or hydroxy-terminated polydimethylsiloxne In one example, a proppant or particle may be comprised of coal or coal-derived material in a polymer or resin matrix that is cured or processed at a temperature of 15° C. to 600° C. preferably in the range of 75° C. to 300° C.

For example, a proppant or particle may be comprised of coal or coal-derived material in a polymer or resin matrix utilized as in the extraction of hydrocarbon materials from the earth or used as a component of equipment that is used in the extraction of hydrocarbon materials from the earth.

This detailed description provides examples including features and elements of the claims for the purpose of enabling a person having ordinary skill in the art to make and use the inventions recited in the claims. However, these examples are not intended to limit the scope of the claims, directly. Instead, the examples provide features and elements of the claims that, having been disclosed in these descriptions, claims and drawings, may be altered and combined in ways that are known in the art.

What is claimed is:

1. A complex composite particle comprises a core comprised of a first material, wherein the first material is a pyrolyzed composite made of a coal dust derived from coal and a polymer precursor that forms a polymer derived ceramic material, the coal dust and the polymer precursor that forms the polymer derived ceramic, when pyrolyzed, being mixed together to form a mixture, the mixture being pyrolyzed in a substantially non-oxidizing atmosphere and transforming into a ceramic matrix composite, wherein the coal dust of the core is preheated at a temperature no greater than 400 degrees centigrade, prior to being mixed with the polymer precursor, to produce an in situ additive comprising carbon and organic compounds that vaporize and react when pyrolyzed in the presence of the polymer precursor, after being mixed with the polymer precursor, and the mixture of the in situ additive and the polymer precursor form the pyrolyzed composite during pyrolyzation.

2. The complex composite particle of claim 1, further comprising a coating substantially enclosing the core within the coating.

3. The complex composite particle of claim 2, wherein the coating is comprised of a polymer derived ceramic material, whereby the coating may be comprised of the same polymer derived ceramic material as the polymer derived ceramic material of the core or a different polymer derived ceramic material than the polymer derived ceramic material of the core.

4. The complex composite particle of claim 3, wherein the polymer derived ceramic material of the core is a silicon-oxy-carbide polymer derived ceramic material.

5. The complex composite particle of claim 4, wherein the polymer derived ceramic material of the coating is the same as the polymer derived ceramic material of the core.

6. The complex composite particle of claim 2, wherein the polymer derived ceramic material of the coating is pyrolyzed in a substantially non-oxidizing atmosphere such that a hard shell substantially encloses the core.

7. The complex composite particle of claim 6, wherein the core comprises substantially no carbon particles after pyrolyzation of the core.

8. The complex composite particle of claim 6, wherein the core comprises carbon particles chemically or physically bonded to a ceramic matrix after pyrolyzation of the core.

9. The complex composite particle of claim 8, wherein the carbon particles are chemically bonded to the ceramic matrix.

10. The complex composite particle of claim 2, wherein the coating is partially dried until tacky.

11. The complex composite particle of claim 2, wherein an initial layer of the coating is pyrolyzed and a subsequent layer of the coating is added to the surface of the initial layer, wherein the subsequent layer is a liquid, slurry or tacky material.

12. The complex composite particle of claim 11, wherein the subsequent layer is partially dried until tacky.

13. The complex composite particle of claim 1, wherein the hydraulic diameter is 3 to 5 microns.

14. The complex composite particle of claim 1, wherein the complex composite particle is combined as building blocks for composite structures or beads made of a plurality of the complex composite particle.

* * * * *